(12) United States Patent
Deng et al.

(10) Patent No.: US 11,257,031 B2
(45) Date of Patent: Feb. 22, 2022

(54) GOODS INFORMATION OBTAINING DEVICE, SHELF, SHELF MANAGING SYSTEM AND METHOD

(71) Applicant: BOE TECHNOLOGY GROUP CO., LTD., Beijing (CN)

(72) Inventors: Wei Deng, Beijing (CN); Hongyan Pei, Beijing (CN); Xin Li, Beijing (CN); Tianyue Zhao, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 131 days.

(21) Appl. No.: 16/491,312

(22) PCT Filed: Mar. 15, 2019

(86) PCT No.: PCT/CN2019/078213
§ 371 (c)(1),
(2) Date: Sep. 5, 2019

(87) PCT Pub. No.: WO2020/001076
PCT Pub. Date: Jan. 2, 2020

(65) Prior Publication Data
US 2020/0401987 A1    Dec. 24, 2020

(30) Foreign Application Priority Data

Jun. 25, 2018 (CN) .......................... 201810659540.9

(51) Int. Cl.
*G06K 9/00* (2006.01)
*G06Q 10/08* (2012.01)
(Continued)

(52) U.S. Cl.
CPC ............. *G06Q 10/087* (2013.01); *B65G 1/02* (2013.01); *G02B 7/182* (2013.01);
(Continued)

(58) Field of Classification Search
CPC ....... G06Q 10/087; G06T 7/70; G06T 3/4038; G06T 7/0002; H04N 5/23299; H04N 5/247; B65G 1/02; B65G 2203/041; G02B 7/182; G06K 9/20; G06K 9/2036; G06K 9/2054; G06K 9/00624; G06K 9/209
See application file for complete search history.

(56) References Cited

U.S. PATENT DOCUMENTS

2008/0077511 A1    3/2008  Zimmerman
2013/0332323 A1   12/2013  Phillips et al.
(Continued)

FOREIGN PATENT DOCUMENTS

CN    1240970 A    1/2000
CN    1794789 A    6/2006
(Continued)

*Primary Examiner* — Howard D Brown, Jr.
(74) *Attorney, Agent, or Firm* — The Webb Law Firm

(57) ABSTRACT

The present disclosure relates to a goods information obtaining device, a shelf, a shelf managing system and a method. A goods information obtaining device for obtaining goods information within a shelf unit, includes: at least one reflector; and at least one image sensor for sensing a reflection image of goods within the shelf unit that are reflected one or more times by the at least one reflector.

13 Claims, 6 Drawing Sheets

(51) Int. Cl.
   *G06T 7/70* (2017.01)
   *H04N 5/232* (2006.01)
   *B65G 1/02* (2006.01)
   *G02B 7/182* (2021.01)
   *G06K 9/20* (2006.01)
   *G06T 3/40* (2006.01)
   *G06T 7/00* (2017.01)
   *H04N 5/247* (2006.01)

(52) U.S. Cl.
   CPC ......... *G06K 9/00624* (2013.01); *G06K 9/209* (2013.01); *G06T 3/4038* (2013.01); *G06T 7/0002* (2013.01); *G06T 7/70* (2017.01); *H04N 5/23299* (2018.08); *H04N 5/247* (2013.01); *B65G 2203/041* (2013.01)

(56) References Cited

U.S. PATENT DOCUMENTS

| | | | | |
|---|---|---|---|---|
| 2014/0347475 | A1* | 11/2014 | Divakaran | G06K 9/00771 348/135 |
| 2015/0049904 | A1* | 2/2015 | Sen | G06Q 10/087 382/103 |
| 2015/0281594 | A1* | 10/2015 | Sakaniwa | H04N 5/265 348/218.1 |

FOREIGN PATENT DOCUMENTS

| | | |
|---|---|---|
| CN | 101131727 A | 2/2008 |
| CN | 101149792 A | 3/2008 |
| CN | 201388246 Y | 1/2010 |
| CN | 102184405 A | 9/2011 |
| CN | 102592144 B | 3/2014 |
| CN | 204089981 U | 1/2015 |
| CN | 104487207 A | 4/2015 |
| CN | 105051763 A | 11/2015 |
| CN | 108175227 A | 6/2018 |
| WO | 2013188583 A2 | 12/2013 |

* cited by examiner

(12) United States Patent

GOODS INFORMATION OBTAINING DEVICE, SHELF, SHELF MANAGING SYSTEM AND METHOD

CROSS-REFERENCE TO RELATED APPLICATIONS

The present application is a U.S. National Stage Application under 35 U.S.C. § 371 of International Patent Application No. PCT/CN2019/078213, filed on Mar. 15, 2019, which claims priority to China Patent Application No. 201810659540.9, filed on Jun. 25, 2018, the disclosures of both of which are incorporated by reference herein in their entirety.

TECHNICAL FIELD

The present disclosure relates to a goods information obtaining device, a shelf, a shelf managing system and a method.

BACKGROUND

With the development and improvement of image recognition technology, image recognition technology is widely applied in various industries. In the commodity retail business, intelligent management of shelf commodities may be realized by capturing products on the shelves and performing image recognition on the captured images.

SUMMARY

In one aspect of the present disclosure, a goods information obtaining device for obtaining goods information within a shelf unit is provided. The goods information obtaining device includes: at least one reflector; and at least one image sensor for sensing a reflection image of goods within the shelf unit that are reflected one or more times by the at least one reflector.

In some embodiments, each of the at least one reflector includes a plane mirror or a convex mirror.

In some embodiments, the at least one image sensor includes a plurality of image sensors, and viewing angles of lenses of the plurality of image sensors adjoin or partially coincide each other at a coverage area of the at least one reflector.

In some embodiments, the goods information obtaining device further includes a driver for driving the at least one image sensor or the at least one reflector to move, such that a viewing angle of a lens of each of the at least one image sensor covers reflection images of different portions of the goods on the at least one reflector at different moments.

In one aspect of the present disclosure, a shelf is provided. The shelf includes: a shelf unit for containing goods; and the goods information obtaining device previously described.

In some embodiments, the at least one reflector is located on one side of a top of the shelf unit close to the goods, and each of the at least one image sensor includes a lens, wherein the lens has a viewing angle covering at least a portion of the at least one reflector.

In some embodiments, the lens has a height no higher than a height of the goods.

In some embodiments, the height of the lens is configured to be flush with a bottom plane of the shelf unit.

In some embodiments, the shelf unit has an open end for accessing the goods, and the at least one image sensor is located within the shelf unit on one side of the shelf unit away from the open end.

In some embodiments, the shelf unit further has a closed end, where the at least one image sensor is located.

In some embodiments, a minimum distance d between the lens and the goods satisfies:

$$d = \frac{H(2D' - H)}{W};$$

where W is a maximum distance between the goods and the lens, H is a height of the goods, and D' is a minimum spatial height of the shelf unit.

In some embodiments, the at least one reflector includes: a first reflector, located on one side of a top of the shelf unit close to the goods; and a second reflector, located on one side opposite to the first reflector; wherein each of the at least one image sensor includes a lens having an orientation configured such that a viewing angle of the lens covers at least a portion of the second reflector.

In some embodiments, the at least one reflector is located external to the shelf unit.

In another aspect of the present disclosure, a shelf managing system is provided. The shelf managing system includes: the goods information obtaining device previously described; and a processor for processing the reflection image.

In some embodiments, the processor is configured to perform at least one of the following operations: analyzing the reflection image to obtain goods information related to placement within the shelf unit; stitching reflection images to form a complete reflection image of the goods within the shelf unit; or detecting whether the goods placed within the shelf unit are out of stock or are wrong goods according to the reflection image.

In another aspect of the present disclosure, a shelf managing system is provided. The shelf managing system includes: the shelf previously described; and a processor for processing the reflection image.

In some embodiments, the processor is configured to perform at least one of the following operations: analyzing the reflection image to obtain goods information related to placement within the shelf unit; stitching reflection images to form a complete reflection image of the goods within the shelf unit; or detecting whether the goods placed within the shelf unit are out of stock or are wrong goods according to the reflection image.

In another aspect of the present disclosure, a shelf managing method is provided. The shelf managing method includes: sensing by an image sensor a reflection image of goods within a shelf unit that are reflected one or more times by an at least one reflector; analyzing the reflection image to obtain goods information related to placement within the shelf unit.

In some embodiments, the shelf managing method further includes: judging whether the goods placed within the shelf unit are out of stock or are wrong goods according to the goods information related to placement.

In some embodiments, the shelf managing method further includes: stitching reflection images to form a complete reflection image of the goods within the shelf unit.

BRIEF DESCRIPTION OF THE DRAWINGS

The accompanying drawings, which constitute part of this specification, illustrate exemplary embodiments of the present disclosure and, together with this specification, serve to explain the principles of the present disclosure.

The present disclosure may be more clearly understood from the following detailed description with reference to the accompanying drawings, in which.

Figure 1:
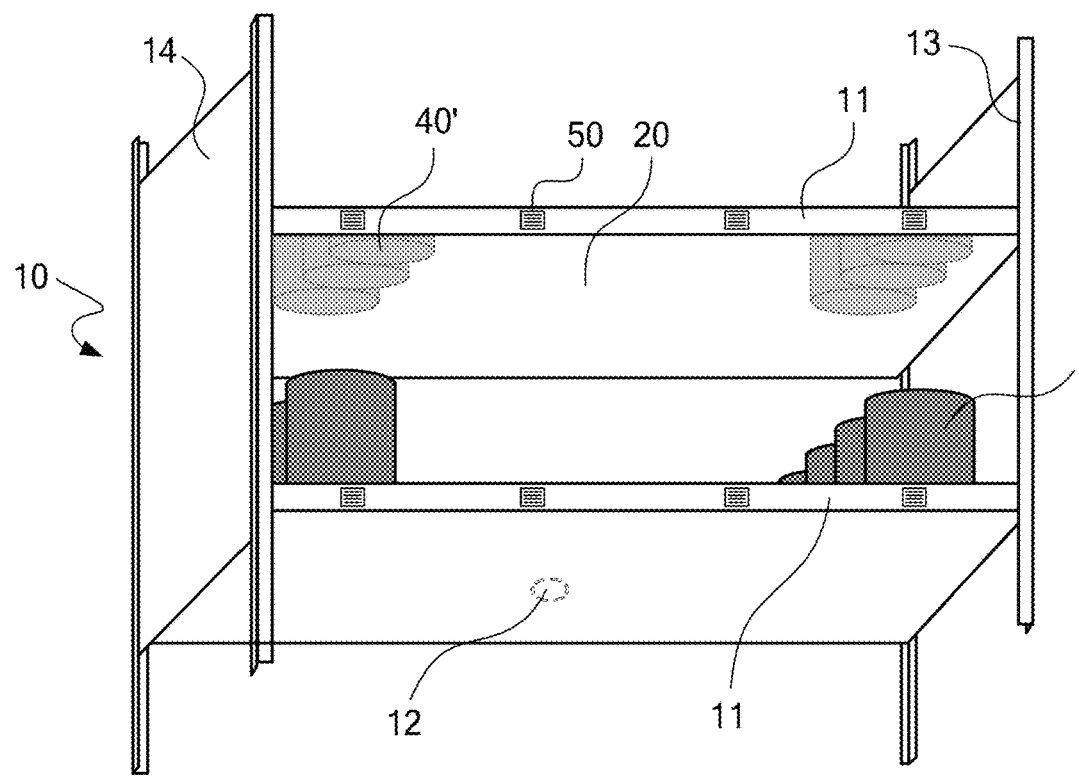
FIG. 1 is a schematic structural view according to one embodiment of the shelf of the present disclosure.

It should be understood that the dimensions of the various parts shown in the accompanying drawings are not drawn according to the actual scale. In addition, the same or similar reference signs are used to denote the same or similar components.

DETAILED DESCRIPTION

Various exemplary embodiments of the present disclosure will now be described in detail with reference to the accompanying drawings. The description of the exemplary embodiments is merely illustrative and is in no way intended as a limitation to the present disclosure, its application or use. The present disclosure may be implemented in many different forms, which are not limited to the embodiments described herein. These embodiments are provided to make the present disclosure thorough and complete, and fully convey the scope of the present disclosure to those skilled in the art. It should be noticed that: relative arrangement of components and steps, numerical expressions, and numerical values set forth in these embodiments, unless specifically stated otherwise, should be explained as merely illustrative, and not as a limitation.

The use of the terms "first", "second" and similar words in the present disclosure do not denote any order, quantity or importance, but are merely used to distinguish among different parts. Such similar words as "including" or "containing" mean that the element preceding the word encompasses the elements enumerated after the word, and does not exclude the possibility of encompassing other elements as well. "Up", "down", "left", "right", and the like are used only to present relative positional relationships, which may also be possibly changed correspondingly when a change is made to an absolute position of the described object.

In the present disclosure, when it is described that a particular device is located between the first device and the second device, there may be an intermediate device between the particular device and the first device or the second device, and alternatively, there may be no intermediate device. When it is described that a particular device is connected to other devices, the particular device may be directly connected to said other devices without an intermediate device, and alternatively, may not be directly connected to said other devices but with an intermediate device.

All the terms (including technical and scientific terms) used in the present disclosure have the same meanings as understood by those skilled in the art of the present disclosure unless otherwise defined. It is also to be understood that the terms defined in for example general-purpose dictionaries should be construed as having meanings consistent with those in the context of the related art, rather than being construed in an idealized or extremely formalized sense unless explicitly thus defined here.

The techniques, methods, and devices known to a common technical person in the relevant art may not be discussed in detail, but where appropriate, the techniques, methods, and devices should be considered as part of the description.

In some related arts, a camera for capturing the products is provided within the shelf. Moreover, in order to enable the camera to capture more product images, the camera often needs to be set at a high position, for example at the top of each layer of shelves, so as to capture the products placed on the bottom plate of the layer of shelves. The inventors have found after research that the camera in the related art needs to be set at a high position, so that the spacing between layers of the shelves is correspondingly increased, which causes that the space utilization rate of the shelf drops.

In view of this, embodiments of the present disclosure provide a goods information obtaining device, a shelf, a shelf managing system, and a method, which can allow the shelf unit to have a smaller spatial height.

FIG. 1 is a schematic structural view according to one embodiment of the shelf of the present disclosure.

Referring to FIG. 1, in some embodiments, the shelf 10 includes: a shelf unit and a goods information obtaining device. The shelf unit has a containing space which may be used for containing the goods 40 so as to display or sell the goods 40. In FIG. 1, the overall structure of the shelf 10 may be formed by assembling an upright post 13, a vertical partition 14 and a horizontal partition 11. The vertical partition 14 and the horizontal partition 11 may enclose one or more shelf units. In other embodiments, the shelf 10 may also use other structural forms, such as an integrated or split shelf.

In some embodiments, the shelf 10 may include a single shelf unit. In other embodiments, the shelf 10 can also include a plurality of shelf units, which may be distributed in a single shelf layer or a plurality of shelf layers. In addition, other members such as a readable/writable label 50 and the like may be provided in the shelf 10 as needed.

In some embodiments, the goods information obtaining device includes at least one reflector 20 and at least one image sensor 12. The image sensor 12 may be used for sensing a reflection image 40' of the goods 40 within the shelf unit, wherein the goods are reflected one or more times by the at least one reflector 20.

The image sensor 12 may sense the reflection image 40' of the goods 40 within the shelf unit. The image sensor 12 may include a Charged Coupled Device (referred to as CCD for abbreviation) image sensor or a Complementary Metal Oxide Semiconductor (referred to as CMOS for abbreviation) image camera of or the like. The reflection image 40' may come from the reflection of the goods 40 at the reflector, such as a mirror or other objects capable of providing a reflective surface. The reflection image 40' here may be a reflection image that is reflected once or a reflection image that is reflected for multiple times.

In the embodiment shown in FIG. 1, the reflector 20 may be disposed within the shelf unit to provide a source for the reflection image to the image sensor 12. The image sensor 12 is capable of sensing reflection image 40' of the goods 40 within the shelf unit that is reflected once by the reflector 20. In other embodiments, the reflector 20 is located external to the shelf unit. The reflector 20 may include a plane mirror to form a clear and regular reflection image 40', thereby reducing the difficulty in subsequent analysis and processing of the reflection images 40'. In other embodiments, the reflector 20 may also include a convex mirror. With a convex reflective mirror, it is possible to allow the image sensor 12 to obtain a wider range of goods reflection image.

In FIG. 1, the reflector 20 may be disposed on one side of a top of the shelf unit close to the goods, so as to adequately utilize the spatial height within the shelf unit. In some embodiments, the reflector 20 may be disposed in the form of an independent member below the bottom plate of the upper layer of shelf units. In other embodiments, the reflector 20 may be mounted on the lower surface of the bottom plate of the upper layer of shelf units, or the reflective surface may be machined on the lower surface of the bottom plate of the upper layer of shelf units to form the reflector 20 or the like.

Referring to FIG. 1, in some embodiments, the image sensor 12 includes a lens. The lens has an orientation configured such that a viewing angle of the lens covers at least a portion of the reflector 20. When the reflector 20 is disposed on the top inside the shelf unit, the lens of the image sensor 12 is directed upward or obliquely upward so that the viewing angle of the lens can cover a part or entirety of the reflector 20. The image sensor 12 may be disposed inside the shelf unit and may also be disposed at a position adjacent to the outside of the shelf unit as needed.

By collecting the reflection image of the goods within the shelf unit, the above-described embodiments of the goods information obtaining device and the shelf of the present disclosure may reduce the setting height of the image sensor relative to the bottom surface of the shelf unit, thereby allowing the shelf unit to use a smaller spatial height, and further improving the overall space utilization rate of the shelf.

In order to explain the saving effect of the shelf according to the embodiments of the present disclosure in the spatial height compared to the shelf in the related art, a comparative description will be made with reference to FIGS. 2 to 4 subsequently.

Figure 2:
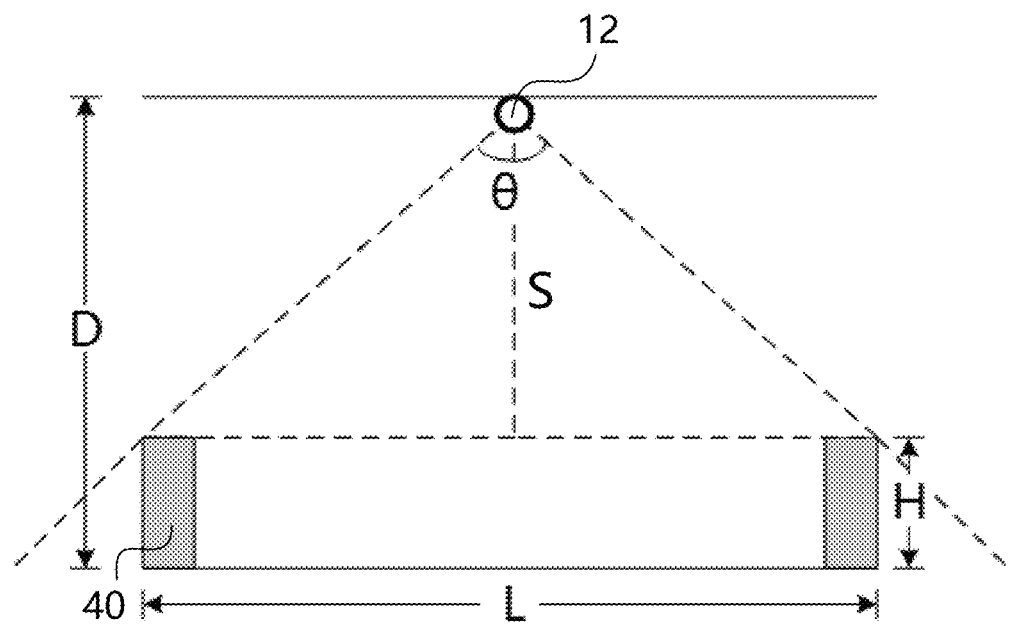
FIG. 2 is a schematic view of a viewing angle coverage of an image sensor according to the related art.

FIG. 2 is a schematic view of a viewing angle coverage of an image sensor according to the related art. FIG. 3 is a schematic view of a forward viewing angle coverage of an image sensor according to one embodiment of the shelf of the present disclosure.

In FIG. 2, the image sensor 12 is disposed at the top of the shelf unit and its lens is provided downward to capture the goods 40 placed within the shelf unit. Assuming that the maximum viewing angle of the lens of the image sensor is $\theta$, in order to obtain a complete top image of the goods 40, the minimum spatial height of the shelf unit is D, the height of the goods 40 is H, and the spatial length occupied by the goods 40 in the forward view is L. D satisfies the following relationship:

$$\tan\left(\frac{\theta}{2}\right) = \frac{L/2}{D-H} \quad (1)$$

Suppose $\theta$ is approximately 120°, then $$0 < \frac{\theta}{2} < \frac{\pi}{2}, \text{ i.e. } \tan\left(\frac{\theta}{2}\right) > 0.$$

The minimum spatial height D of the shelf unit should be greater than the height H of the goods 40, i.e. D>H.

According to the formula (1), it may be calculated that D satisfies:

$$D = H + \frac{L/2}{\tan\left(\frac{\theta}{2}\right)} \quad (2)$$

Figure 3:
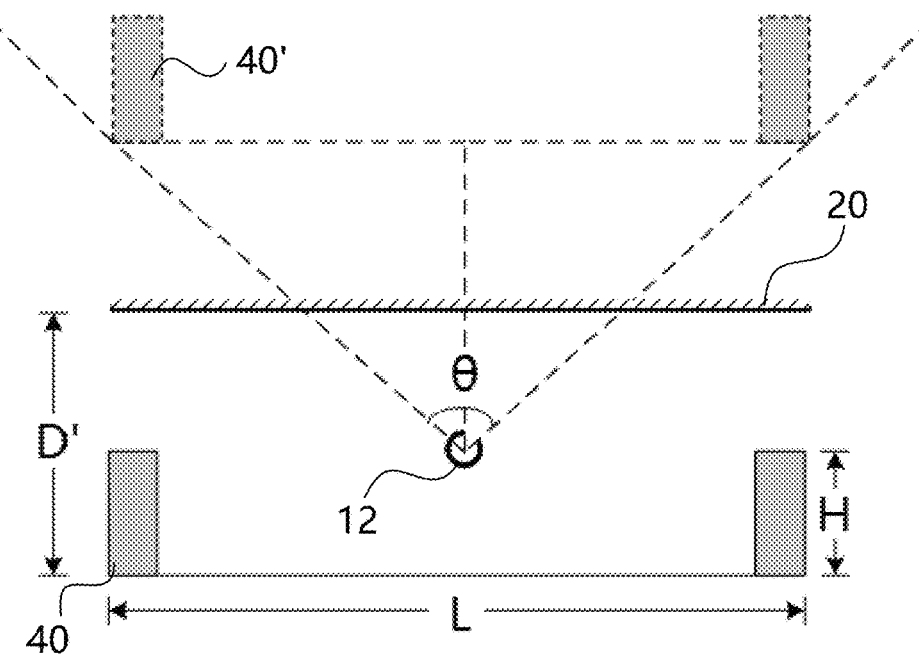
FIG. 3 is a schematic view of a forward viewing angle coverage of an image sensor according to one embodiment of the shelf of the present disclosure.

Referring to FIG. 3, in some embodiments of the shelf of the present disclosure, in order to avoid that the image sensor 12 is shielded by the goods 40, the height of the lens may be configured to be no less than that of goods 40. If the image sensor 12 is set higher, it is also possible to increase the spatial height of the shelf along therewith. For convenience of calculation, the height of the lens of the image sensor 12 is set to be the same as the height of the goods 40 in FIG. 3.

Referring to FIG. 3, it is still assumed that the maximum viewing angle of the lens of the image sensor is $\theta$. Since the height of the lens of the image sensor 12 is set to be the same as the height of the goods 40, so that there is no such a problem that the image sensor 12 is shielded by the goods 40, the actual viewing angle of the image sensor is also $\theta$. The minimum spatial height of the shelf unit is D', and in order to obtain a complete top image of the goods 40, the height of the goods 40 is H. The spatial length occupied by the goods 40 in the forward view is L. D' satisfies the following relationship:

$$\tan\left(\frac{\theta}{2}\right) = \frac{L/2}{2(D'-H)} \quad (3)$$

According to the formula (3), it may be derived that D' satisfies:

$$D' = H + \frac{L/2}{2\tan\left(\frac{\theta}{2}\right)} \quad (4)$$

If the formula (1) is substituted into the formula (4), it may be obtained that:

$$D' = \frac{D+H}{2} \quad (5)$$

Since D>H, D'<D. Thus, it may be known that the shelf unit of the present embodiment can allow to use a smaller spatial height than the shelf in the related art, thereby effectively improving the space utilization rate of the shelf.

Figure 4:
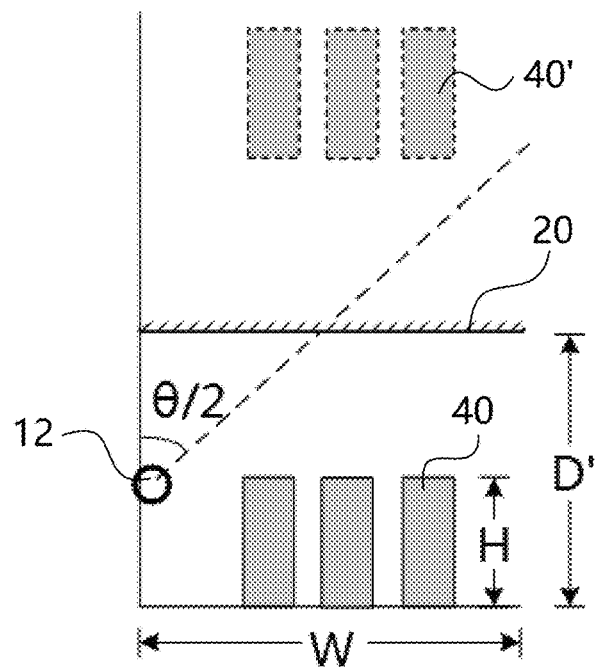
FIG. 4 is a schematic view of a side viewing angle coverage of an image sensor according to one embodiment of the shelf of the present disclosure.

FIG. 4 is a schematic view of a side viewing angle coverage of an image sensor according to one embodiment of the shelf of the present disclosure.

Referring to FIG. 4, the shelf unit according to some embodiments of the shelf of the present disclosure has an open end for accessing the goods 40 (i.e., an open area on the right side of the goods), and the image sensor 12 may be disposed within the shelf unit and on one side away from the open end (i.e., the left side of the goods). In this way, the goods 40 may be placed close to the open end so as to be accessed or placed by the purchaser or the staff responsible for loading and unloading the goods with convenience. The side may be set to be a closed end, and the image sensor 12 may be fixed at the closed end or fixed at a position close to the closed end. In other embodiments, the installation position of the image sensor 12 may also be an open end.

In FIG. 4, the height of the lens of the image sensor 12 may be set to be the same as the height of the goods 40. In some application scenarios, it is possible to maintain a certain distance between the goods 40 and the image sensor 12 on the other side of the goods 40 when the goods 40 is placed. Thus, even if the height of the lens of the image sensor 12 is set lower, it is also possible to avoid that the lens is shielded by the goods 40. Consequently, depending on the placement distance of the goods relative to the image sensor 12, the height of the lens may be configured to be no higher than the height of the goods. Correspondingly, the allowed spatial height of the shelf unit of the shelf 40 may be further reduced.

Figure 5:
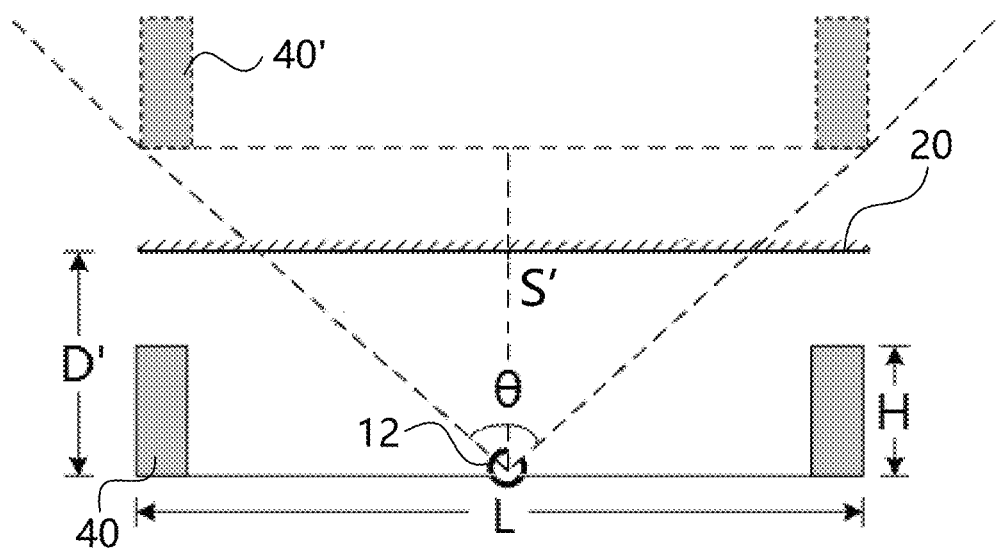
FIG. 5 is a schematic view of a forward viewing angle coverage of an image sensor according to another embodiment of the shelf of the present disclosure.

FIG. 5 is a schematic view of a forward viewing angle coverage of an image sensor according to another embodiment of the shelf of the present disclosure.

Referring to FIG. 5, in some embodiments, the height of the lens may be configured to be flush with a bottom plane of the shelf unit. If it is still assumed that the maximum viewing angle of the lens of the image sensor is θ, the vertical distance S' between the reflection image of the goods 40 and the lens of the image sensor 12 is D'+(D'−H). Moreover, the vertical distance S between the reflection image of the lens of the image sensor 12 and the goods 40 in the related art shown in FIG. 2 is D−H. When the maximum viewing angle of the lens of the image sensor is θ, and the spatial length of the goods 40 occupied in the forward view is L, referring to the formula (3), it may be derived that S'=S=(tan(θ/2)*L)/2, i.e. D'+(D'−H)=D−H, so that it may be derived that D'=D/2. Currently, the minimum spatial height D' of the shelf unit in this embodiment is only half of the minimum spatial height D of the shelf unit in the related art, thereby effectively improving the space utilization rate of the shelf.

Figure 6:
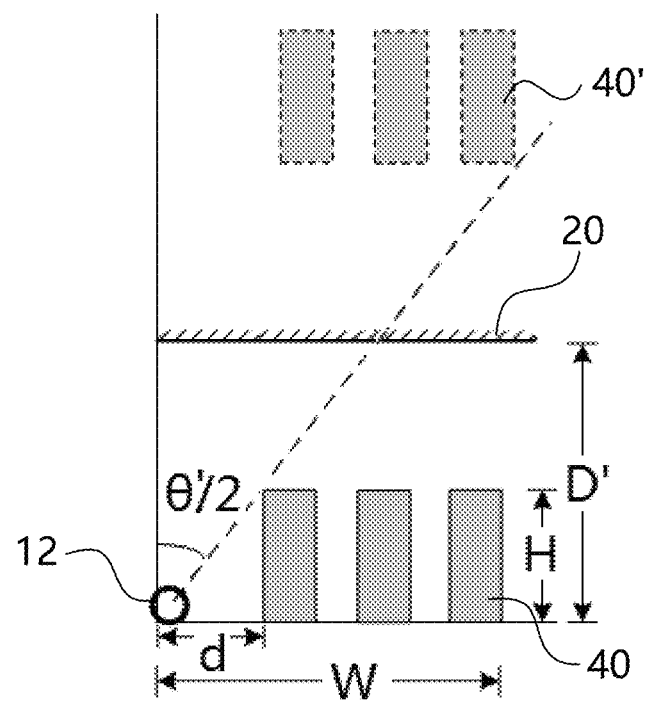
FIG. 6 is a schematic view of a side viewing angle coverage of an image sensor according to another embodiment of the shelf of the present disclosure.

FIG. 6 is a schematic view of a side viewing angle coverage of an image sensor according to another embodiment of the shelf of the present disclosure.

Referring to FIG. 6, the image sensor 12 currently is already substantially at the lowest position of the shelf unit. Considering that the goods 40 might shield the viewing angle of the lens of the image sensor 12, the actual viewing angle of the lens of the image sensor 12 is θ'/2 after the lens is shielded by the goods 40 on the right side, and θ' is required to be less than or equal to the maximum viewing angle θ of the camera.

In order to eliminate the effect that the actual viewing angle is shielded, when the goods 40 is placed, the minimum distance d between the goods 40 and the image sensor 12 may satisfy that:

$$\tan\left(\frac{\theta'}{2}\right) = \frac{H}{d} \quad (6)$$

and at the same time satisfies that:

$$\tan\left(\frac{\theta'}{2}\right) = \frac{W}{2D'-H} \quad (7)$$

W is a furthest distance between the goods 40 and the image sensor 12, H is a height of the goods 40, and D' is a minimum spatial height of the shelf unit. According to the formulas (6) and (7), it may be derived that the minimum distance d between the goods 40 and the image sensor 12 is:

$$d = \frac{H(2D'-H)}{W} \quad (8)$$

The staff may set the position of the image sensor 12 according to the formula (8), or place the goods 40 according to the formula (8), so as to effectuate covering the complete reflection image of the articles within the shelf unit whilst effectuating a small allowed spatial height of the shelf unit.

Figure 7:
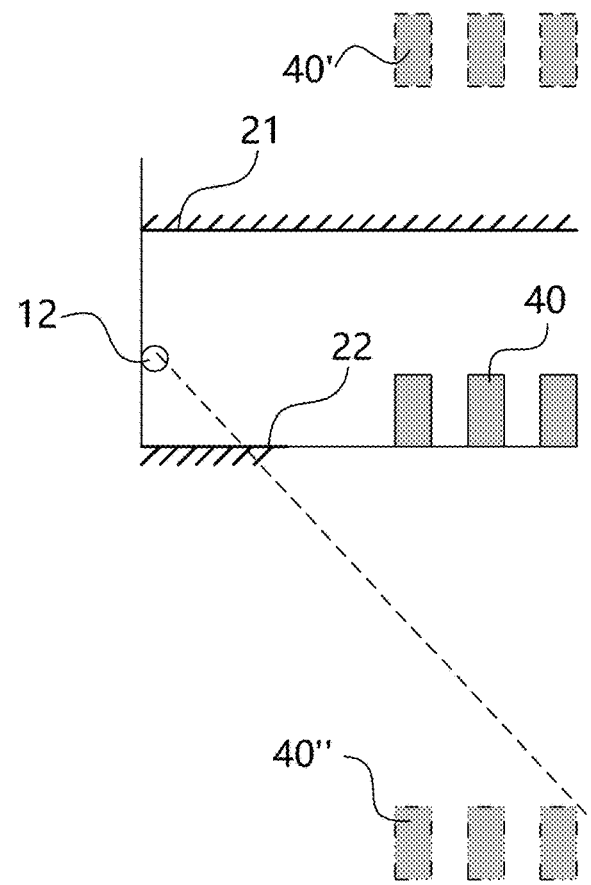
FIG. 7 is a schematic view of an image sensor sensing a reflection image reflected for multiple times according to one embodiment of the shelf of the present disclosure.

FIG. 7 is a schematic view of an image sensor sensing reflection image reflected for multiple times according to one embodiment of the shelf of the present disclosure.

Referring to FIG. 7, in some embodiments, a plurality of reflectors 20, such as a first reflector 21 and a second reflector 22, may be disposed within the shelf unit. The first reflector 21 is located on one side of a top of the shelf unit close to the goods 40; and the second reflector 22 is located on one side opposite to the first reflector 21. The image sensor 12 includes a lens. The lens has an orientation configured such that a viewing angle of the lens covers at least a portion of the second reflector 22.

In FIG. 7, the first reflector 21 having a large size may be disposed inside the shelf unit and on the top of the shelf unit, and the second reflector 22 having a small size may be disposed on one side close to a position where the image sensor 12 is located. The viewing angle of the lens of the image sensor 12 may cover the second reflector 22 and sense the reflection image 40" reflected by the second reflector 22. The reflection image 40" is derived from the reflection effect of the second reflector 22 over the reflection image 40' and the reflection image 40' is derived from the reflection effect of the first reflector 21 over the goods 21 below the same. In this way, the image sensor 12 can sense reflection image 40" of the goods 40 within the shelf unit that is reflected for multiple times by the plurality of reflectors 20. By sensing the reflection image that is reflected for multiple times, it is possible to further reduce the allowed space of the shelf unit of the shelf and cover a larger placement range of the goods. On the other hand, by configuring a plurality of reflectors at different positions, the image sensor 12 may be set at more flexible positions.

In some embodiments of the shelf presented above, the viewing angle of the lens of the image sensor exactly covers the reflection image of all the goods of the shelf unit for ease of understanding and formula derivation. However, in actual use, it is possible to allow the viewing angle of the lens of the image sensor to cover the reflection image of all the goods of the shelf unit, or it is also possible to only cover the reflection image of part of the goods in the shelf unit.

Figure 8:
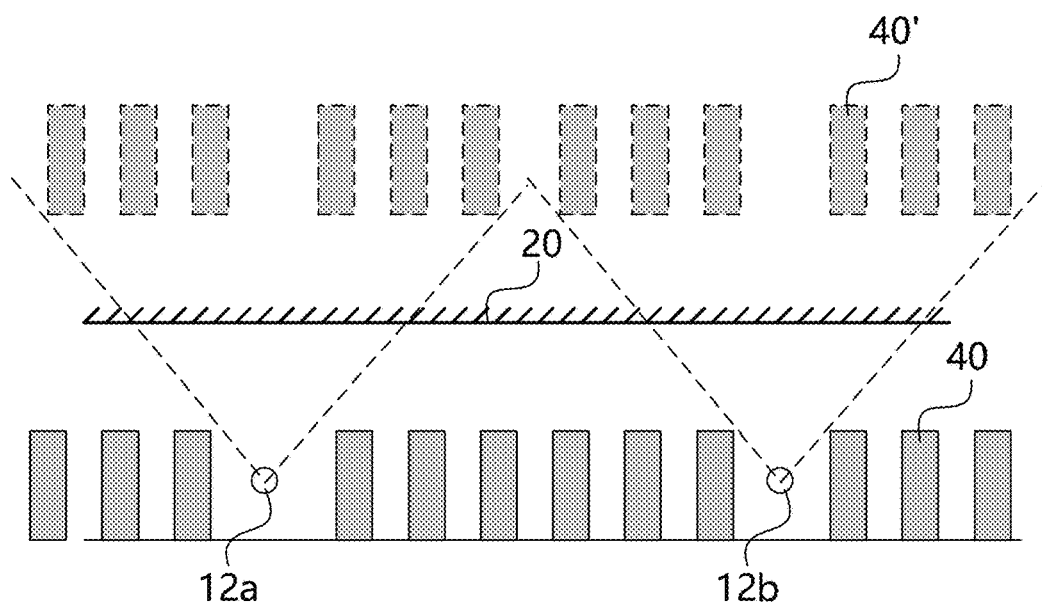
FIG. 8 is a schematic view of a viewing angle coverage of an image sensor according to one embodiment of the goods information obtaining device according to the present disclosure.

FIG. 8 is a schematic view of a viewing angle coverage of an image sensor according to one embodiment of the goods information obtaining device according to the present disclosure.

Referring to FIG. 8, in some embodiments, the goods information obtaining device may include a plurality of image sensors 12a, 12b, and viewing angles of lenses of the plurality of image sensors may respectively cover a partial area of the reflector 20. Moreover, the coverage areas respectively corresponding to these image sensors 12a, 12b may adjoin with each other or partially coincide. The reflection images 40' of the goods 40 collected by the image sensors 12a, 12b respectively, may form an overall reflection image of the goods within the shelf unit in an image stitching manner. Alternatively, the reflection images 40' of the goods 40 collected by the image sensors 12a, 12b respectively, may be subjected to image processing respectively.

By providing a plurality of image sensors, even if the viewing angle of the lens of each image sensor can cover a limited range of reflection image, it is still possible to obtain complete goods information related to placement in a subsequent image processing manner. In addition, referring to the previous calculation formulas, when the spatial height of the shelf unit is further reduced, the collection of the reflection image may be performed by providing more image sensors, so that it is possible to allow a spatial height of a smaller shelf unit.

In addition to the manner of providing a plurality of image sensors, the image sensors may also be driven to move to achieve a wider range of coverage.

Figure 9:
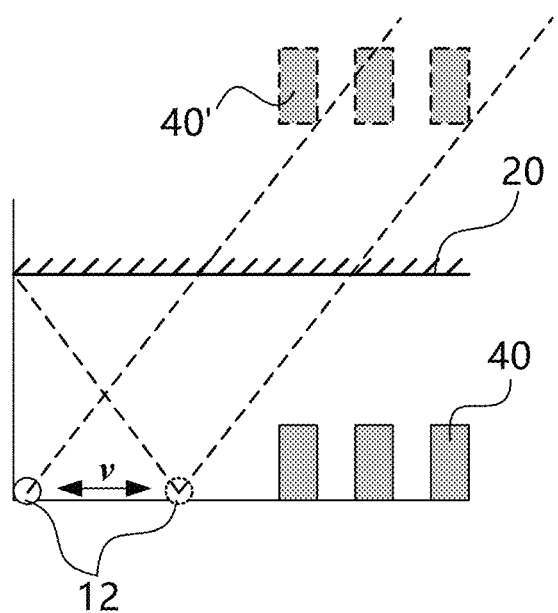
FIG. 9 is a schematic view of a viewing angle coverage of an image sensor according to another embodiment of the goods information obtaining device according to the present disclosure.

FIG. 9 is a schematic view of a viewing angle coverage of an image sensor according to another embodiment of the goods information obtaining device according to the present disclosure.

Referring to FIG. 9, in some embodiments, the goods information obtaining device further includes a drive mechanism. The drive mechanism may be a motor, a hydraulic cylinder, an air cylinder or a pulley block and the like. The driver is used for driving the image sensor 12 to move, such that a viewing angle of the lens of the image sensor 12 covers reflection images 40' of different portions of the goods 40 on the reflector 20 at different moments. The reflection images 40' of the goods 40 collected by the image sensors 12 at different moments, may form an overall reflection image of the goods within the shelf unit in an image stitching manner. Alternatively, the reflection images 40' of the goods 40 collected by the image sensors 12 at different moments, may be subjected to image processing respectively. In addition to driving the image sensors 12 to move, the drive mechanism may also drive the reflector 20 to move such as translate or rotate the reflector 20. Of course, the drive mechanism may also drive both the reflector 20 and the image sensors 12 to move.

By the driver driving the image sensor or the reflector, even if the viewing angle of the lens of the image sensor can cover a limited range of reflection image, it is still possible to obtain complete goods information related to placement in a subsequent image processing manner. In addition, referring to the previous calculation formulas, when the spatial height of the shelf unit is further reduced, the drive mechanism may be correspondingly provided to achieve a greater range of motion, thereby allowing a spatial height of a smaller shelf unit.

In other embodiments, the drive mechanism may also be used for driving a plurality of image sensors or a plurality of reflectors to move.

The above-described shelves may be applied in various fields or occasions where the acquisition of the shelf placement information is required, for example the smart shelf field. The present disclosure also provides some embodiments of a shelf management system based on the above-described respective shelf embodiments.

Figure 10:
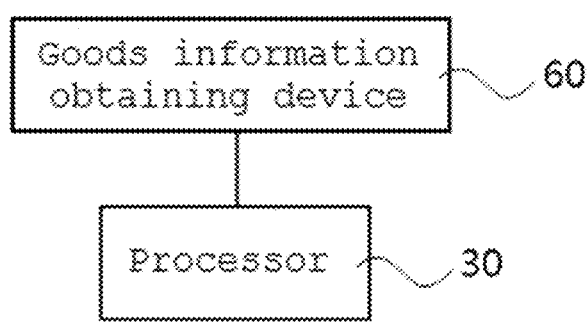
FIG. 10 is a block schematic diagram according to one embodiment of the shelf managing system according to the present disclosure.

FIG. 10 is a block schematic diagram according to one embodiment of the shelf managing system according to the present disclosure.

Referring to FIG. 10, in some embodiments, the shelf managing system includes any of the foregoing embodiments of the goods information obtaining device 60 and a processor 30. The processor 30 is used for processing the reflection image of the goods within the shelf unit. The reflection image is derived from the sensed data of the image sensor 12 in the goods information obtaining device 60.

In some embodiments, the processing operations of the reflection image 11 by the processor may include: analyzing the reflection image to obtain goods information related to placement within the shelf unit. For example, the reflection image is compared with the standard images in the database to analyze whether the current goods placement is normal. For another example, the image feature information is extracted from the reflection image or the reflection image is semantically analyzed to determine the current goods information related to placement and the like.

The processing operations of the reflection image 11 by the processor may also include: detecting whether the goods placed within the shelf unit are out of stock or are wrong goods according to the reflection image. For example, when the reflection image is inconsistent with the standard placed images in the database, it is indicated that the shelf unit is out of stock or contains wrong goods and needs to be adjusted by the staff.

In other embodiments, the processing operations of the reflection image 11 by the processor may also include: stitching reflection images to form a complete reflection image of the goods within the shelf unit. The complete reflection image of the goods within the shelf unit is formed by using an image stitching method in the related art, in which for example, the reflection images sensed by a plurality of image sensors respectively or a plurality of reflection images collected by the image sensors at different moments are subjected to stitching by a processor.

Figure 11:
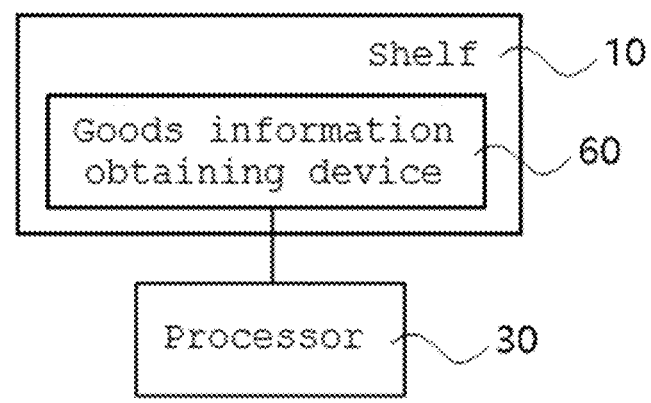
FIG. 11 is a block schematic diagram according to another embodiment of the shelf managing system according to the present disclosure.

FIG. 11 is a block schematic diagram according to another embodiment of the shelf managing system according to the present disclosure.

Referring to FIG. 11, in some embodiments, the shelf managing system includes any of the foregoing embodiments of the shelf 10 and a processor 30. The processor 30 is used for processing the reflection image of the goods within the shelf unit. The reflection image is derived from the sensed data obtained by the goods information obtaining device 60.

In some embodiments, the processing operations of the reflection image 11 by the processor may include: analyzing the reflection image to obtain goods information related to placement within the shelf unit. For example, the reflection image is compared with the standard images in the database to analyze whether the current goods placement is normal. For another example, the image feature information is extracted from the reflection image or the reflection image is semantically analyzed to determine the current goods information related to placement and the like.

The processing operations of the reflection image 11 by the processor may also include: detecting whether the goods placed within the shelf unit are out of stock or are wrong goods according to the reflection image. For example, when the reflection image is inconsistent with the standard placed images in the database, it is indicated that the shelf unit is out of stock or contains wrong goods and needs to be adjusted by the staff.

In other embodiments, the processing operations of the reflection image 11 by the processor may also include: stitching reflection images to form a complete reflection image of the goods within the shelf unit. The complete reflection image of the goods within the shelf unit are formed by using an image stitching method in the related art, in which for example, the reflection images sensed by a plurality of image sensors respectively or a plurality of reflection images collected by the image sensors at different moments are subjected to stitching by a processor.

Figure 12:
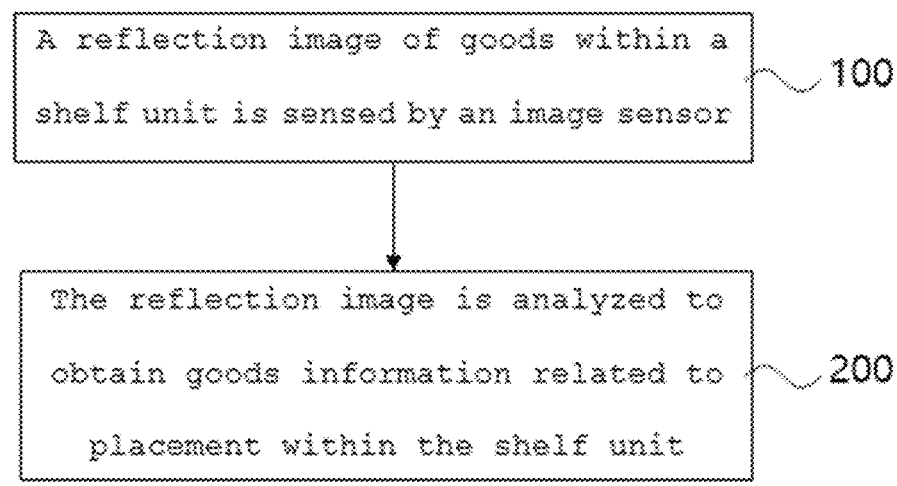
FIG. 12 is a schematic flow chart according to one embodiment of the shelf managing method according to the present disclosure.

FIG. 12 is a schematic flow chart according to one embodiment of the shelf managing method according to the present disclosure.

Referring to FIG. 12, in some embodiments, the shelf managing method may include a step 100 and a step 200. The shelf managing method may be implemented based on any one of the foregoing embodiments of the shelf. In step 100, a reflection image of goods within a shelf unit that are reflected one or more times by an at least one reflector is sensed by an image sensor. In step 200, the reflection image is analyzed to obtain goods information related to placement within the shelf unit.

In some embodiments, it is also possible to judge whether the goods placed within the shelf unit are out of stock or are wrong goods according to the goods information related to placement. In some embodiments, it is also possible to stitch reflection images to form a complete reflection image of the goods within the shelf unit.

Multiple embodiments in the present description are described in a progressive manner, with different focuses for the respective embodiments which may be subjected to cross-reference for the same or similar portions. For the embodiments of the method, since the whole and the steps involved of the method are in a relationship corresponding to the content in the embodiments of the shelf and the shelf managing system, such embodiments are described in a relatively simple manner. The partial descriptions of the embodiments of the shelf and the shelf managing system may be referred thereto for the relevant aspects.

Hereto, various embodiments of the present disclosure have been described in detail. Some details well known in the art are not described to avoid obscuring the concept of the present disclosure. According to the above description, those skilled in the art would fully know how to implement the technical solutions disclosed herein.

Although some specific embodiments of the present disclosure have been described in detail by way of examples, those skilled in the art should understand that the above examples are only for the purpose of illustration and are not intended to limit the scope of the present disclosure. It should be understood by those skilled in the art that modifications to the above embodiments and equivalently substitution of part of the technical features may be made without departing from the scope and spirit of the present disclosure. The scope of the disclosure is defined by the following claims.

What is claimed is:

1. A shelf, comprising:
a shelf unit for containing goods; and
the goods information obtaining device, comprising at least one reflector and at least one image sensor for sensing a reflection image of goods within the shelf unit that are reflected one or more times by the at least one reflector,
wherein the at least one reflector is located on one side of a top of the shelf unit close to the goods, and each of the at least one image sensor comprises a lens which has a viewing angle covering at least a portion of the at least one reflector, the lens has a height no higher than a height of the goods, the height of lens is configured to be flush with a bottom plane of the shelf unit, and a minimum distance d between the lens and the goods satisfies:

$$d = \frac{H(2D' - H)}{W},$$

where W is a maximum distance between the goods and the lens, H is a height of the goods, and D' is a minimum spatial height of the shelf unit.

2. The shelf according to claim 1, wherein the shelf unit has an open end for accessing the goods, and the at least one image sensor is located within the shelf unit and on one side of the shelf unit away from the open end.

3. The shelf according to claim 2, wherein the shelf unit further has a closed end, where the at least one image sensor is located.

4. The shelf according to claim 1, wherein the at least one reflector comprises:
a first reflector, located on one side of a top of the shelf unit close to the goods; and
a second reflector, located on one side opposite to the first reflector;
wherein each of the at least one image sensor comprises a lens having an orientation configured such that a viewing angle of the lens covers at least a portion of the second reflector.

5. The shelf according to claim 1, wherein the at least one reflector is located external to the shelf unit.

6. A shelf managing system, comprising:
the shelf according to claim 1; and
a processor for processing the reflection images.

7. The shelf managing system according to claim 6, wherein the processor is configured to perform at least one of the following operations:
analyzing the reflection image to obtain goods information related to placement within the shelf unit;
stitching reflection images to form a complete reflection image of the goods within the shelf unit; or
detecting whether the goods placed within the shelf unit are out of stock or are wrong goods according to the reflection image.

8. A method for managing the shelf according to claim 1, comprising:
sensing by a plurality of image sensors a reflection image of goods within a shelf unit that are reflected one or more times by at least one reflector, wherein viewing angles of lenses of the plurality of image sensors adjoin or partially coincide each other at a coverage area of the at least one reflector;

analyzing the reflection image to obtain goods information related to placement within the shelf unit; and stitching reflection images to form a complete reflection image of the goods within the shelf unit.

9. The method according to claim 8, further comprising:
judging whether the goods placed within the shelf unit are out of stock or are wrong goods according to the goods information related to placement.

10. The shelf according to claim 1, wherein each of the at least one reflector comprises a plane mirror or a convex mirror.

11. The shelf according to claim 1, wherein the at least one image sensor comprises a plurality of image sensors, and viewing angles of lenses of the plurality of image sensors adjoin or partially coincide each other at a coverage area of the at least one reflector.

12. The shelf according to claim 1, further comprising a driver for driving the at least one image sensor or the at least one reflector to move, such that a viewing angle of a lens of each of the at least one image sensor covers reflection images of different portions of the goods on the at least one reflector at different moments.

13. The method according to claim 8, further comprising:
stitching reflection images to form a complete reflection image of the goods within the shelf unit.

* * * * *